United States Patent
Bineau et al.

(10) Patent No.: US 9,934,680 B2
(45) Date of Patent: Apr. 3, 2018

(54) MANAGING THE CONTROL OF AN ELECTRICAL DEVICE CONTROLLABLE BY INFRARED CONTROL SIGNALS

(71) Applicant: VOLTALIS, Paris (FR)

(72) Inventors: Mathieu Bineau, Versailles (FR); Pierre Cren, Issy les Moulineaux (FR); Christophe Dubreuil, Toulouse (FR); Bruno Heintz, Paris (FR); Hugues Lefebvre De Saint Germain, Hong Kong (CN); Jean-Marc Oury, Paris (FR)

(73) Assignee: VOLTALIS, Paris (FR)

( * ) Notice: Subject to any disclaimer, the term of this patent is extended or adjusted under 35 U.S.C. 154(b) by 0 days.

(21) Appl. No.: 15/024,201

(22) PCT Filed: Sep. 22, 2014

(86) PCT No.: PCT/FR2014/052349
§ 371 (c)(1),
(2) Date: Mar. 24, 2016

(87) PCT Pub. No.: WO2015/044570
PCT Pub. Date: Apr. 2, 2015

(65) Prior Publication Data
US 2016/0232784 A1 Aug. 11, 2016

(30) Foreign Application Priority Data
Sep. 24, 2013 (FR) .................................. 13 59157

(51) Int. Cl.
*H04B 10/11* (2013.01)
*H04B 10/114* (2013.01)
(Continued)

(52) U.S. Cl.
CPC ............... *G08C 23/04* (2013.01); *H02J 3/14* (2013.01); *H02J 13/0079* (2013.01);
(Continued)

(58) Field of Classification Search
None
See application file for complete search history.

(56) References Cited

U.S. PATENT DOCUMENTS

2010/0030391 A1   2/2010   Oury et al.
2012/0109395 A1   5/2012   Finch et al.
(Continued)

OTHER PUBLICATIONS

Search Report dated 2015.

*Primary Examiner* — Darren E Wolf
(74) *Attorney, Agent, or Firm* — Ipsilon USA, LLP

(57) ABSTRACT

An apparatus for managing the control of an electrical device controllable by infrared control signals (IR_Cmd) from an infrared remote control. The apparatus is placed opposite an infrared receiver module of the electric device so as to receive on the infrared receiver any infrared control signal (IR_Cmd) from the remote control and to prevent any infrared control signal (IR_Cmd) from the remote control from directly reacting the infrared receiver module. A controller controls the transmission to the electrical device, via the infrared emitter, of infrared control signals generated from infrared control signals (IR_Cmd) received by the infrared receiver or control signals received by the interface module, in accordance with a set of compatibility and/or priority rules relating to the execution of the received control signals.

12 Claims, 2 Drawing Sheets

(51) Int. Cl.
*H04B 10/40* (2013.01)
*H04B 10/50* (2013.01)
*H04B 10/60* (2013.01)
*G08C 23/04* (2006.01)
*H02J 3/14* (2006.01)
*H02J 13/00* (2006.01)

(52) U.S. Cl.
CPC ............ *H04B 10/11* (2013.01); *H04B 10/114* (2013.01); *H04B 10/40* (2013.01); *H04B 10/50* (2013.01); *H04B 10/60* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 2012/0231837 A1* | 9/2012 | Hilbrink | H04M 1/72533 455/556.1 |
| 2012/0242526 A1 | 9/2012 | Perez et al. | |
| 2013/0183042 A1 | 7/2013 | Knapp et al. | |

* cited by examiner

MANAGING THE CONTROL OF AN ELECTRICAL DEVICE CONTROLLABLE BY INFRARED CONTROL SIGNALS

RELATED APPLICATIONS

This application is a National Phase Application of PCT/FR2014/052349, filed on Sep. 22, 2014, which in turn claims the benefit of priority from French Patent Application No. 13 59157 filed on Sep. 24, 2013, the entirety of which are incorporated herein by reference.

BACKGROUND

Field of the Invention

The present invention concerns in a general manner the field of electrical devices that can be controlled remotely by an infrared remote control, and more particularly the management of the commands for such electrical devices.

Description of Related Art

Energy costs at present impose refined and controlled management of electrical power consumption. Such management is necessary not only at the level of the electrical devices themselves but also in the electrical power supply networks that supply them with power. Regulation of consumption on the electrical grid at regional or national scale may include action at the local scale, for example covering a plurality of homes.

Existing energy consumption management systems take diverse forms. From the simplest domestic electric heating thermostat to centralized management of entire apartment blocks, these systems make it possible to monitor the supply of electrical power to electrical devices as a function of received setpoints.

In particular, the Applicant has already proposed a method of management and of modulation in real time of an electrical power consumption, in published French patent application FR 2 904 486. That method makes it possible, on the one hand, to analyze the electrical power consumption of a plurality of end users, and to compare it to the instantaneous availability of electrical power generation on the network. That method makes it possible, on the other hand, to establish continuously an individual consumption profile for each consumer to deduce therefrom an individual prediction of their consumption and the available capacities. That method makes it possible, finally, to modulate selectively the supply of electrical power to certain electrical devices in the homes of these end users.

Modulation of the supply coupled to the analysis of the consumption of a large number of users makes it possible to adapt the electrical power consumption to the generation capacity available at a given time. In other words, instead of increasing energy production in the event of a demand exceeding the scheduled generating capacity, example, it becomes possible to counterbalance this increase by reducing the consumption at very numerous consumption points in the network. This is referred to as "diffuse consumption reduction". For example, diffuse consumption reduction makes it possible to minimize sudden variations in energy requirements (for example in the early evening in wintertime), in order to limit the financial consequences of these consumption peaks. In actual fact, the latter are usually compensated by starting up inactive, very costly and often polluting generation plant.

The above management method has proved its worth. However, some devices employing infrared control, such as air conditioners, for example, are complex to integrate. For example, an instruction to switch off the supply of electrical power or to reduce the consumption of electrical power sent to this type of device in the context of the management method has the consequence of reinitializing the operating parameters of the device, with the risk of problems arising when it is restarted.

Moreover, in the field of the management of devices controlled by infrared in the context of a home automation network, it has already been proposed to replace conventional infrared remote controls supplied with the equipment concerned by a universal remote control. The integration of some devices, such as air conditioners, into home automation networks via universal remote controls remains complicated, however, if not impossible at present. In actual fact, a large number of infrared controls exist for each type of device but at present there is no standard covering them. The large number of manufacturers and the multiplicity of air conditioner designs give rise to a number of problems. In particular:

a universal remote control being intended to be substituted for the original remote control, it is rare for its ergonomics and its display to be suited to all of the devices that it is deemed to be able to control;

because of the very large number of sets of infrared commands, as explained above, it is frequently the case that specific commands, such as speed variation, dehumidification or purification of the air in the case of an air conditioner, are not supported by universal remote controls.

OBJECTS AND SUMMARY

An object of the invention is to alleviate the disadvantage of the known systems.

To this end, the present invention consists in an apparatus for managing the control of an electrical device, said device being controllable by infrared control signals from an infrared remote control associated with the electrical device, said control management apparatus including an infrared receiver, an infrared emitter and an interface module suitable for receiving control signals emitted by a third-party management system, said control management apparatus being adapted to be placed opposite an infrared receiver module of the electric device so as to receive on the infrared receiver any infrared control signal from the remote control and to prevent any infrared control signal from said remote control from directly reaching the infrared receiver module, and including a controller adapted to control the transmission to the electrical device, via the infrared emitter, of infrared control signals generated from infrared control signals received by the infrared receiver or control signals received by the interface module, in accordance with a set of compatibility and/or priority rules relating to the execution of the received control signals.

It is therefore possible to choose to transmit as such a control signal received by the management apparatus, or to choose to ignore it, possibly temporarily, or to create a new control signal obtained by application of the compatibility and/or priority rules.

In accordance with other, particularly advantageous options:

the interface module may be adapted to allow the sending of data to the third party management system;

the interface module may be adapted to allow exchanges of signals of CPT, and/or radio-frequency, notably WiFi, and/or ZigBee, and/or GPRS/3G/4G type;

the interface module and the infrared receiver may be combined;

the control management apparatus may further comprise a standby power supply;

the control management apparatus may further comprise human-machine interface means such as a visual indicator, and/or a display screen, and/or a keypad including at least one button;

the control management apparatus may further comprise a serial interface module of USB, RS232, Firewire, Thunderbolt, HDMI, KNX, RJ45, RJ12 or BacNet type;

the control management apparatus may be further adapted to update the set of the compatibility and/or priority rules on the basis of update information received by the interface module, and/or by the serial interface module;

the control management apparatus may further include a memory adapted to store a log of the use of the set of rules, notably the control signals transmitted or not to the electrical device;

the memory may be additionally adapted to store any data that may be received by the apparatus from the third party management system and/or the electrical device and/or the infrared remote control.

The present invention also consists in a method of managing control of an electrical device controllable by infrared control signals from an infrared remote control associated with the electrical device, the method comprising the following steps:

using a control management apparatus including an infrared receiver, intercepting any infrared control signal from said infrared remote control;

receiving on an interface module of the control management apparatus control signals emitted by a third party management system; and transmitting to the electrical device via an infrared emitter of the control management apparatus infrared control signals generated from infrared control signals received by the infrared receiver or control signals received by the interface module, as a function of a set of compatibility and/or priority rules relating to the execution of the received control signals.

For any control signal received, the transmission step preferably comprises the steps of:

verification of the existence of an execution already in progress or programmed corresponding to another control signal received beforehand;

if necessary, verification of the compatibility of an execution of the command received with an execution already in progress or programmed corresponding to the other control signal received beforehand in accordance with said set of rules;

in the event of incompatibility, verification of the priority to be assigned to the execution of the command received or to the execution already in progress or programmed in accordance with said set of rules.

In one possible embodiment, any control signal received when no other execution in progress or programmed exists, or any control signal received the execution of which is deemed compatible with another execution in progress or programmed, or any control signal received the execution of which is deemed incompatible with but has priority over another execution in progress or programmed is transmitted by the infrared emitter of the control management apparatus.

Any control signal received the execution of which is deemed incompatible with or not to have priority over another execution in progress or programmed is preferably stored for subsequent execution.

The present invention also consists in the use of the control management apparatus in a control management system in which the third party management system is a system for management and modulation in real time of an electrical power consumption comprising a pilot unit connected to a centralized platform, the control signals emitted by the third party management system notably comprising instructions to disconnect or to reduce the power consumption of the electrical device.

BRIEF DESCRIPTION OF THE DRAWINGS

The invention and its particular advantages will be better understood in the light of the following description, given with reference to the appended figures, in which.

DETAILED DESCRIPTION

Figure 1:
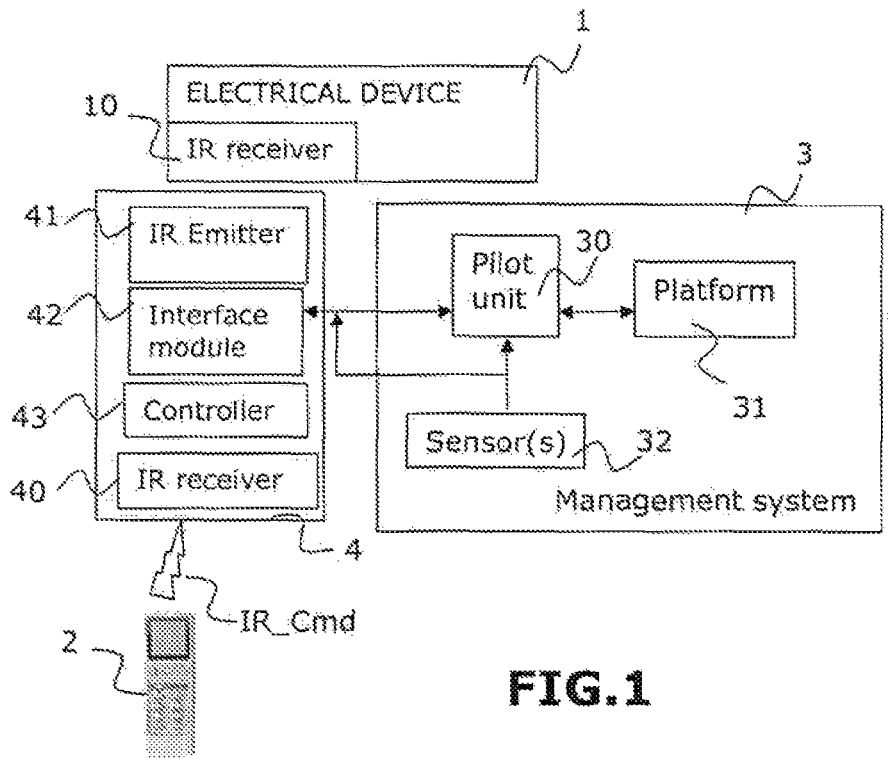
FIG. 1 represents diagrammatically a system in accordance with the invention for managing the control of an electrical device adapted to be controlled by infrared signals.

FIG. 1 represents in diagrammatic form a system architecture enabling management of the control of an electrical device 1, by way of nonlimiting example an air conditioner, adapted to be controlled by infrared signals installed on private or corporate premises.

The electrical device 1 conventionally includes a module 10 for receiving infrared signals adapted to receive infrared control signals, such as signals IR_Cmd generated by a conventional infrared remote control 2 supplied with the electrical device 1. In accordance with the invention, it is required to be able to integrate this electrical device 1 and its associated remote control into a wider control management system that must make it possible:

on the one hand, for the user owning the electrical device 1 to control the device using their conventional infrared remote control 2;

on the other hand, for a third party management system 3 also to control the electrical device 1.

By third party management system 3 is meant any system other than conventional management by a device/remote control combination. The third party management system 3 may therefore be a system for management and modulation in real time of an electrical power consumption implementing the above method and including, for example, as shown in FIG. 1, a pilot unit 30 connected to a centralized platform 31, for example an internet server, and one or more sensors 32 installed on the user's premises to measure local environmental parameters such as temperature, brightness, presence of persons, etc.

In this case, the pilot unit 30 may be either a unit installed on the user's premises and connected to one or more electrical devices including the electrical device 1 or a unit geographically near the building in which the electrical device 1 is installed. For such a system for management and modulation in real time of the electrical power consumption, the commands issued by the third party management system will essentially consist in commands to eliminate consumption, but may equally correspond to personalized management by the user via the centralized platform 31, such as, for example, programming starting up of the air conditioner at a given time, for a given period, and/or in accordance with a given setpoint temperature.

Alternatively, the third party management system 3 may be any home automation system or any building technical management system, local or not, notably enabling management of the operation of the electrical device 1 as a function of parameters recorded in a user profile (time periods, temperature, etc). Once again, a centralized server of the third party management system may advantageously enable the user to program their device remotely.

In all cases, the system in accordance with the invention further includes a control management apparatus that will serve as intermediary between, on the one hand, the combination formed by the conventional infrared remote control 2 and the electrical device 1 and, on the other hand, the combination formed by the third party management system 3 and the electrical device 1. To be more specific, the control management apparatus 4 is adapted to be positioned in front of the module 10 for receiving infrared signals so as to prevent any control signal IR_Cmd generated by the conventional infrared remote control 2 directly reaching the module 10 for receiving infrared signals.

Such a control signal IR_Cmd is in fact received first by an infrared receiver 40 of the apparatus 4, instead of and in place of the module 10 for receiving infrared signals, before possibly being transmitted by an infrared emitter 41 of the apparatus 4 to the module 10 for receiving infrared signals as a function of compliance with predefined compatibility and/or priority rules applied by a controller 43.

In fact, the control management apparatus 4 is therefore mounted in front of the module 10 of the electrical device 1 for receiving infrared signals so as to serve as an infrared shield via a vis the remote control 2. This can be achieved by having the infrared emitter 41 have a sufficiently extensive surface to cover all of the surface of the module 10 for receiving infrared signals. The control management apparatus 4 may be installed on the electrical device 1 by gluing it on or using adhesive, optionally transparent tape, using a magnetic fixing system, clipping it on or a combination of the above methods.

Moreover, the control management apparatus 4 also includes an interface module 42 notably adapted to receive control signals TPM_Cmd coming from the third party management system 3, for example from the pilot unit 30. As the connection between the interface module 42 and the third party management system 3 may be a cable connection or a wireless connection, the interface module 42 is adapted, as appropriate, to enable the exchange of signals of CPL, radio frequency, notably WiFi, ZigBee, and/or GPRS/3G/4G, or even infrared type. In the latter case, the interface module 42 and the receiver 40 may be one and the same.

The interface module 42 is preferably also adapted to enable the sending of data to the third party management system 3.

Once again, a control signal TPM_Cmd received by the interface module 42 will be transmitted by the infrared emitter 41 of the apparatus 4 to the module 10 for receiving infrared signals only as a function of compliance with predefined compatibility and/or priority rules.

Figure 2:
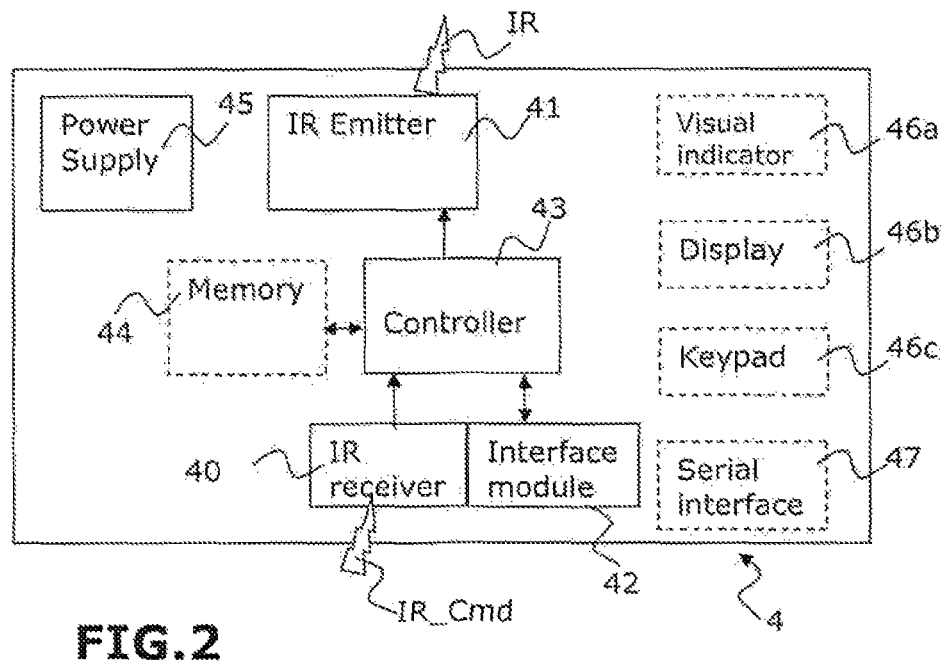
FIG. 2 shows in simplified form a control management apparatus in accordance with one possible embodiment of the present invention.

FIG. 2 shows in more detail a control management device 4 in accordance with one possible embodiment of the invention. In this figure, the elements represented in dashed outline are considered optional and could be omitted and/or replaced in variant embodiments. There are seen in this FIG. 2 the elements already described with reference to FIG. 1, in particular:

the infrared receiver 40 adapted to receive infrared signals, notably control signals IR_Cmd emitted by the remote control 2 associated with the electrical device 1;

the interface module 42 adapted to receive control signals TPM_Cmd emitted by the third party management system 3;

the controller 43 adapted to command as a function of a set of compatibility and/or priority rules the transmission to the electrical device of the infrared control signals received by the infrared receiver 40 or the control signals received by the interface module 42; and the infrared emitter 41 adapted to emit infrared control signals intended for the module 10 of the electrical device 1 for receiving infrared signals following the reception and the processing of the commands generated by the remote control 2 and/or by the third party management system 3, subject to compatibility and priority constraints.

In the FIG. 2 example, which illustrates one possible embodiment, the control management apparatus 4 further includes a memory 44, an individual power supply unit 45 and human-machine interface means such as a visual indicator 46a, a display screen 46b and a keypad 46c, and a serial interface module 47, for example of USB type.

The individual power supply unit 45 can be connected either to the power supply of the electrical device 1 to be controlled or to the same electrical mains supply as that electrical device 1. Alternatively, the control management apparatus 4 may equally be connected by the serial interface module 47 to the third party management system 3 and be USB-powered. Finally, the control management apparatus 4 may include a back-up power supply, such as a battery (not shown), to supply power in the event of loss of mains power.

The visual indicator 46a makes it possible to inform a user that the control management apparatus 4 is in fact receiving infrared commands from the remote control 2, in the conventional manner for television remote controls. It may furthermore be used to indicate that the control management apparatus 4 is operating correctly, and/or that an action originating from the third party management system 3 is in progress, and/or that an error has been detected, etc. This visual indicator 46a may be a light-emitting diode or any other appropriate visual signaling means.

The display screen 46b can be used to display a text or symbolic representation of a command transmitted to the electrical device 1 and/or an operating mode or status of the third party management system 3 (notably in the case of a home automation network) and/or a status of the control management apparatus 4, as well as any other useful information. This can in particular make it possible for the user of the electrical device 1 to be informed of the operating status of the control management apparatus 4 and also to understand why, in some situations, a command IR_Cmd from the remote control 2 is not executed by the electrical device 1.

The keypad 46c, which may be reduced to a single button, may be used to configure the apparatus 4 locally, for example to enter time periods and/or to modify the compatibility and/or priority rules, and even to force the execution of a command not normally considered to have priority.

The serial interface module 47 can be of any known type, for example USB, RS232, Firewire, Thunderbolt, HDMI, KNX, RJ45, RJ12 or BacNet type.

In operation, as previously stated, the control management apparatus 4 receives, control signals IR_Cmd via the infrared receiver 40, these control signals IR_Cmd being generated by the remote control 2, and control signals TPM_Cmd via the interface module 42, these control signals TPM_Cmd being generated by the third party management system 3.

On reception of any of these control signals, the controller 43, which may beneficially include a clock, will analyze that control signal so as to verify in particular:

if there exists an execution already in progress or programmed corresponding to another control signal received beforehand;

where appropriate, if the execution of the command received is not incompatible with an execution already in progress or programmed corresponding to the other control signal received beforehand;

in the event of incompatibility, whether the execution of the command received has priority over the execution already in progress or programmed or not.

To this end, the control management apparatus 4 has at least one set of compatibility and/or priority rules. It should be noted that verifying only the compatibility or only the priority of the commands may be envisaged.

The set of compatibility and/or priority rules depends of course on the intended application, as much at the level of the third party management system as at the level of the electrical device to be controlled. There may notably be a rule that all commands from the third party management system always have priority over commands from the remote control, or vice versa. Depending on the nature of the commands, it is also possible for some commands from the remote control to have priority over some commands from the third party management system.

Any control signal received when there exists no other execution in progress or programmed, or any control signal received the execution of which is deemed compatible with another execution in progress or programmed, or any control signal received the execution of which is deemed incompatible with but to have priority over another execution in progress or programmed is transmitted by the infrared emitter 41 of the control management apparatus 4.

Any control signal received the execution of which is deemed incompatible with and not to have priority over another execution in progress or programmed is preferably stored for possible execution afterwards according to the set of compatibility and/or priority rules.

The log of the application of the rules, notably a copy of the signal transmitted to the electrical device 1, may advantageously also be sent to the third party management system 3 via the interface module 42 and/or stored in the memory 44 for future application of the set of rules.

Figure 3:
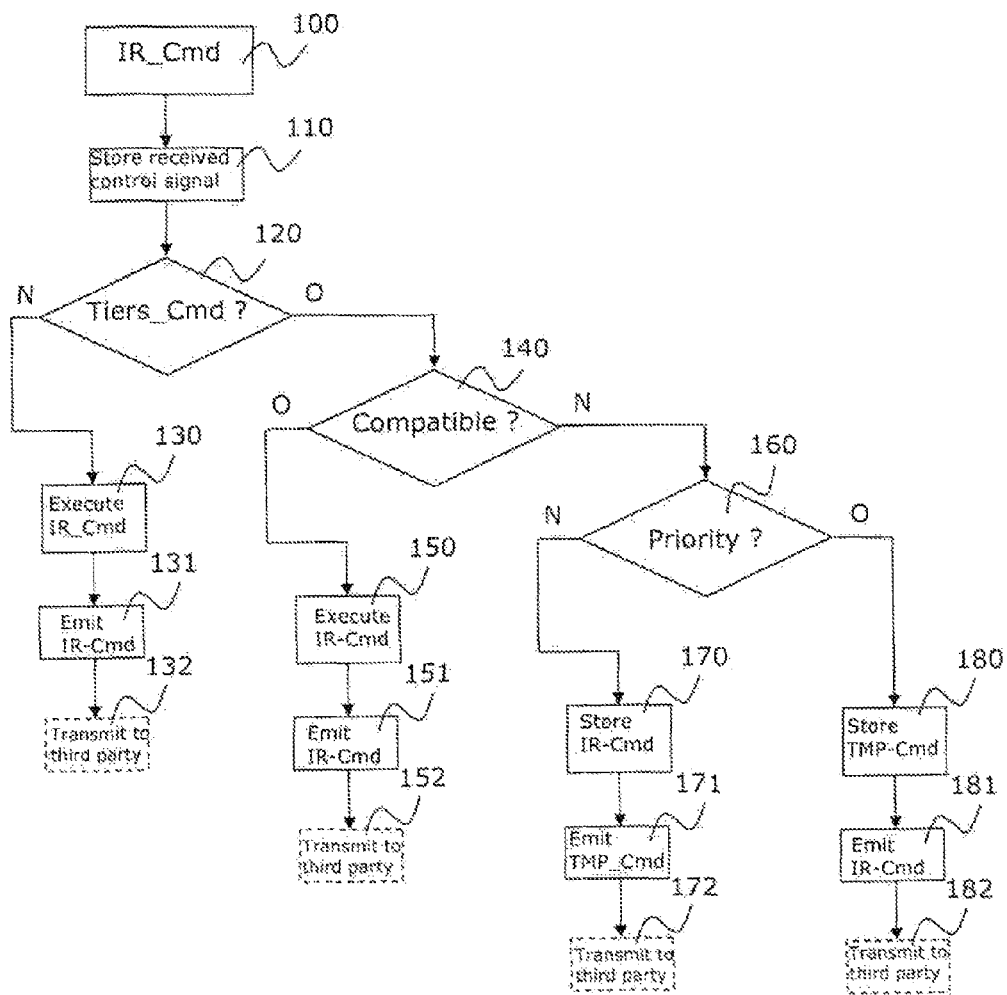
FIG. 3 shows an example of various steps that can be executed by the control management apparatus from FIG. 2.

FIG. 3 represents one example of the various steps that can be executed by the control management apparatus from FIG. 2. In this nonlimiting example it is assumed that the electrical device 1 to be controlled is an air conditioner and that the third party management system 3 is a system for management and modulation of the electrical power consumption of the electrical installation including in particular the device 1. The operating principle of the set of rules is in this case that commands received from the third party management system 3 generally have priority. In actual fact, these commands make it possible to implement diffuse consumption reduction and their execution is therefore indispensable. Even in the case of some other type of third party management system, such as a more simplistic home automation network, it is often preferable for commands from the remote control 2 not to have priority.

Here the process begins with the reception via the receiver 40 of an infrared control signal IR_Cmd from the remote control 2 in a step 100. The received control signal is stored in the memory 44 to which the controller 43 has access (step 110). The latter then carries out a test (step 120) to determine if a command TPM_Cmd from the third party management system is already being executed or if its execution is programmed.

If there exists no execution in progress or programmed corresponding to a command TPM_Cmd, the apparatus 4 then acts as a simple transmitter of the remote control 2. For this purpose, the controller 43 stores in the memory 44 the result of the application of the compatibility and/or priority rules, typically the control signal IR_Cmd that will be transmitted, and where appropriate data indicative of the state in which the electrical device 1 will find itself after the execution of the command IR_Cmd (step 130), and then commands the emitter 41 so that it emits (step 131) a replica of the command IR_Cmd. Note that the replica is not necessarily emitted immediately and that its emission may be deferred depending on the nature of the command. This replica is also preferably transmitted to the third party management system 3, for example to the pilot unit 30, via the interface module 42 (step 132).

Conversely, if the result of the test carried out in the step 120 is that a command TPM_Cmd is currently being executed or programmed, the controller 43 determines the compatibility between the execution of the two commands TPM_Cmd and IR_Cmd (step 140). This can be done by executing a function Comp( ) that receives as arguments the command IR_Cmd and the command TPM_Cmd. The function Comp( ) may be implemented in various ways. For example, the memory 44 may contain for all the electrical devices 1 that the apparatus 4 is able to control a truth table type table that indicates a compatibility value for each (TPM_Cmd, IR_Cmd) pair. For example, this compatibility value may be of the type 0 or 1 and serve directly as output of the function Comp( ). Other embodiments of the function Comp( ) are also possible.

For example, if the user wishes to control the air conditioner using the remote control to produce an ambient temperature of 19 degrees when the ambient temperature is currently 21 degrees and a command to reduce consumption is already being executed or is to be executed very shortly the commands must be deemed incompatible.

If the test carried out in step 140 determines that the two commands are compatible, the apparatus 4 again acts as a simple transmitter of the remote control 2: the controller 43 stores in the memory 44 the result of the application of the compatibility and/or priority rules, typically the control signal IR_Cmd that will be transmitted, and possibly data indicative of the status in which the electrical device 1 will find itself after the execution of the command IR_Cmd (step 150), then commands the emitter 41 so that it emits (step 151) a replica of the command IR_Cmd. The replica is preferably transmitted to the third party management system, for example to the pilot unit 30, via the interface module 42 (step 152).

Conversely, if the result of the test carried out in the step 140 is that the two commands are incompatible, a second test is carried out (step 160) to verify if, in accordance with said set of rules, the execution the command received has priority over the execution of a command already in progress or programmed.

If the test carried out in the step 160 determines that the execution of the received command IR_Cmd does not have priority, that command IR_Cmd is stored in the memory 44 (step 170) pending completion of the execution of the command TPM_Cmd. To start the execution of the command TPM_Cmd, the controller 43 commands the emitter 41 to emit (step 171) a replica of this command TPM_Cmd. The replica is preferably transmitted to the third party management system 3, for example to the pilot unit 30, via the interface module 42 and/or stored in the memory 44 (step 172). As soon as the command IR_Cmd will no longer be deemed incompatible, or after completion of the execution of the command TPM_Cmd, the command IR_Cmd could where appropriate be executed in accordance with steps 150 to 152.

Conversely, if the result of the test carried out in the step 160 is that the execution of the received command IR_Cmd has priority over the command TPM_Cmd, that command TPM_Cmd is stored in the memory 44 (step 180) pending the completion of the execution of the command IR_Cmd. The controller 43 commands the emitter 41 to emit (step 181) a replica of the command IR_Cmd. The replica is preferably transmitted to the third party management system 3, for example to the pilot unit 30, via the interface module 42 and/or stored in the memory 44 (step 182). As soon as the command IR_Cmd will no longer be deemed incompatible, or after completion of the execution of the command IR_Cmd, the command TPM_Cmd could where appropriate be executed.

In all cases where a command has been executed, the apparatus 4 preferably sends a confirmation of the correct execution of that command to the third party management system via the interface module 42.

The method example illustrated in FIG. 3 starts from the principle that commands received from the third party management system 3 generally have priority over those received from the remote control 2 and shows the steps that can be implemented on reception of a command generated by the remote control.

This method may nevertheless be easily generalized to the processing of any received control signal, whether emitted by the remote control 2 or by the third party management system 3 and regardless of the compatibility and/or priority rules. Accordingly, without departing from the scope of the invention, the test 120 may more generally, on reception of arty command, consist in verifying the existence of any execution in progress or programmed relating to a command received beforehand, the test 140 may consist in verifying the compatibility of the execution of any command received with any execution already in progress or programmed, and the test 160 may consist in verifying the priority to be given to the execution of any command received or to the execution already in progress or programmed.

Moreover, the method illustrated in FIG. 3 starts from the principle that after the application of the set of rules the control signal received by the control management apparatus 4 is either transmitted unchanged to the electrical device 1 or stored with a view to possible subsequent execution. Without departing from the scope of the invention, other situations may nevertheless be envisaged in which the signal finally transmitted to the electrical device 1 is a third party control signal resulting from the application of the set of rules to the control signal received and to the execution already in progress or programmed. For example, if an instruction to interrupt the supply of electrical power is programmed in the next few minutes and if the temperature in the room is 24° C., then a command to reduce the temperature to 20° C. sent by the remote control, deemed incompatible according to the set of rules, could advantageously be converted into a command to reduce the temperature to 22° C., compatible with the programmed execution.

Other improvements may be made to the control management process. For example, if a plurality of identical commands have been stored, the controller 43 may be configured to command the retransmission of a reduced number of commands. For example, in the case of an air conditioner to which a user might have sent repeatedly a "reduce temperature" type command incompatible with a command TPM_Cmd in progress, this makes it possible to prevent too sudden a drop in temperature when the incompatibility ceases to exist.

Moreover, when present, the display screen 46b may be controlled to indicate to the end user that a command is already in progress.

The serial interface module 47, for example of USB type, makes it possible to use external peripherals (screen, keypad) if required. At the same time, this serial interface module 47 can be used to add cable or wireless communication possibilities or to update the software and/or the set of compatibility and/or priority rules. Instead of or in addition to this these updates may also be applied via the interface module 42 following an exchange of data with the third party management system 3.

The serial interface module 47 and/or the interface module 42 may moreover be connected to environmental sensors 32 such as temperature, humidity, presence of persons and other sensors. The data from these sensors 32 can be stored in the memory 44 or communicated to the third party management system 3 via the interface module 42. The controller 43 can also use this data as parameters of the set of control rules in order to take decisions regarding the control of the electrical device 1 as a function of the data.

The autonomous operation of the apparatus 4 relative to the third party management system 3, in particular the pilot unit 30, may advantageously be strengthened by the ability to pre-program control setpoints of the electrical devices 1, linked to data from the sensors 32 or not. This programming may be effected either via the third party management system 3 or directly on the apparatus 4 using the keypad 46c or via the serial interface module 47.

The keypad 46c can moreover allow the user to impose a waiver command that will be interpreted as a priority command.

Thanks to the control management apparatus in accordance with the invention it is a simple matter to integrate any electrical device that can be controlled by infrared into a more complex third party management system at the same time as enabling the user to use the usual remote control supplied with the device.

The connection between the third party management system 3 and the management apparatus 4 is preferably bidirectional so as also to allow feedback of information from the apparatus 4 to the third party management system 3. This information may be of various kinds and may have various uses:

In particular, the memory 44 can store a log of all commands received (from the third party management system 3 or from the remote control 2), any command executed or any command not executed. This log may be sent to the third party management system in real time, or regularly or at the request of the third party system. For example, the third party system will be able to use this data to predict better subsequent commands that it may send. If the third party management is a real time modulation system, this can notably enable this system not to send a switch-off instruction to a device that cannot be switched off and instead to send a switch-off instruction to another device. Moreover, the third party management system can also use this data to enable the user to consult the log via the centralized platform 31.

In the foregoing description, the control management apparatus 4 has been described in a complete version notably enabling it to store data locally thanks to the memory 44. Without departing from the scope of the invention, other versions may nevertheless also be envisaged in which the memory would be remotely located, for example at the level of the third party management system 3.

The invention claimed is:

1. A control management apparatus for managing the control of an electrical device, said electrical device being controllable by infrared control signals (IR Cmd) from an infrared remote control associated with the electrical device and said electrical device including an infrared receiver module, said control management apparatus comprising:
    an infrared receiver;
    an infrared emitter; and
    an interface module suitable for receiving control signals (TPM_Cmd) emitted by a third-party management system,
    wherein said control management apparatus is adapted to be fixed to the electrical device in front of said infrared receiver module of the electric device so as to receive on the infrared receiver any infrared control signal (IR Cmd) from the remote control and to prevent any infrared control signal (IR Cmd) from said remote control from directly reaching the infrared receiver module
    said control management apparatus further including a controller adapted to control, via the infrared emitter, transmission to the electrical device, of infrared control signals generated from infrared control signals (IR Cmd) received by the infrared receiver and/or from control signals (TPM_Cmd) received by the interface module, as a function of a set of compatibility and/or priority rules relating to the execution of the received control signals.

2. The control management apparatus as claimed in claim 1, wherein the interface module is adapted to allow the sending of data to the third party management system.

3. The control management apparatus as claimed in claim 1, wherein the interface module is adapted to allow exchanges of signals of CPL and/or radio-frequency.

4. The control management apparatus as claimed in claim 1, wherein the interface module and the infrared receiver are combined.

5. The control management apparatus as claimed in claim 1, further comprising a standby power supply.

6. The control management apparatus as claimed in claim 1, further comprising human-machine interface, selected from the group consisting of a visual indicator, and/or a display screen, and/or a keypad including at least one button.

7. The control management apparatus as claimed claim 1, further comprises a serial interface module of USB, RS232, Firewire, Thunderbolt, HDMI, KNX, RJ45, RJ12 or BacNet type.

8. The control management apparatus as claimed in claim 7, wherein the controller is further adapted to update the set of the compatibility and/or priority rules on the basis of update information received by the interface module, and/or by the serial interface module.

9. The control management apparatus as claimed in claim 1, further including a memory adapted to store a log of the use of the set of rules.

10. The control management apparatus as claimed in claim 9, wherein any data received by the apparatus from the third party management system and/or the electrical equipment and/or the infrared remote control is stored in said memory.

11. A method of managing control of an electrical device, said electrical device including an infrared receiver module and being controllable by infrared control signals (IR Cmd) from an infrared remote control associated with the electrical device, the method comprising the steps of:
    fixing a control management apparatus including an infrared receiver, to the electrical device in front of said infrared receiver module of the electric device for intercepting any infrared control signal (IR Cmd) from said infrared remote control;
    receiving on an interface module of the control management apparatus control signals (TPM Cmd) emitted by a third party management system; and
    transmitting to the electrical device via an infrared emitter of the control management apparatus infrared control signals generated from infrared control signals (IR Cmd) received by the infrared receiver and/or from control signals (TPM Cmd) received by the interface module, as a function of a set of compatibility and/or priority rules relating to the execution of the received control signals.

12. A control management system for management and modulation in real time of an electrical power consumption, said control management system comprising:
    a control management apparatus as claimed in claim 1,
    a pilot unit connected to a centralized platform,
    wherein the control signals (TPM Cmd) emitted by the third party management system include instructions to disconnect or to reduce the power consumption of the electrical device.

* * * * *